United States Patent [19]

Brännström

[11] Patent Number: 5,176,475
[45] Date of Patent: Jan. 5, 1993

[54] TRANSFER CHAMBERS FOR THE CONVEYOR IN A PNEUMATIC TRANSPORT SYSTEM

[75] Inventor: Roine Brännström, Finspong, Sweden

[73] Assignee: ABB Stal AB, Sweden

[21] Appl. No.: 721,570

[22] PCT Filed: Jan. 12, 1990

[86] PCT No.: PCT/SE90/00024
 § 371 Date: Jul. 16, 1991
 § 102(e) Date: Jul. 16, 1991

[87] PCT Pub. No.: WO90/08085
 PCT Pub. Date: Jul. 26, 1990

[30] Foreign Application Priority Data
 Jan. 16, 1989 [SE] Sweden ............... 8900134

[51] Int. Cl.⁵ ............................. B65G 53/52
[52] U.S. Cl. ............................. 406/191; 406/195; 285/137.1; 165/150; 165/178
[58] Field of Search ............ 406/191, 109, 195, 198; 285/137.1, 131; 165/150, 178

[56] References Cited

U.S. PATENT DOCUMENTS

| | | |
|---|---|---|
| 1,410,548 | 3/1922 | Brown . |
| 1,875,663 | 12/1932 | Sandstrom . |
| 2,301,113 | 11/1942 | Ettington et al. ............ 165/158 |
| 2,396,650 | 3/1946 | Hannah . |
| 2,892,261 | 6/1959 | Armstrong . |
| 4,747,449 | 5/1988 | Nickell ................. 165/158 X |
| 4,767,243 | 8/1988 | Brannstrom ............... 406/193 |

FOREIGN PATENT DOCUMENTS

| | | |
|---|---|---|
| 108505 | 5/1984 | European Pat. Off. ......... 406/122 |
| 1023060 | 1/1958 | Fed. Rep. of Germany . |
| 562547 | 5/1957 | Italy . |
| 213193 | 12/1983 | Japan . |
| 334117 | 8/1930 | United Kingdom . |

Primary Examiner—Margaret A. Focarino
Assistant Examiner—Gary C. Hoge
Attorney, Agent, or Firm—Pollock, Vande Sande & Priddy

[57] ABSTRACT

A pneumatic transport system for transferring particulate material from a first pressurized container to a second container which is under a lower pressure, while successively reducing the pressure, comprising a number of parallel tubes (36), arranged in series, said tubes being joined together at their ends by means of transfer chambers (38) for transferring a gas/material stream from an upstream tube (36) to a downstream tube (36). The transfer chamber (38) are formed with tubular inlets and outlets (52, 56) opening out into a space (54) where a gas/material stream is transferred from the inlet (52) to the outlet (56). Between the inlet (52) and the outlet (56) there is a double-bent unsymmetrical surface, bulging towards the space (54), which conforms to the wall surfaces of the inlet (52) and the outlet (56).

4 Claims, 3 Drawing Sheets

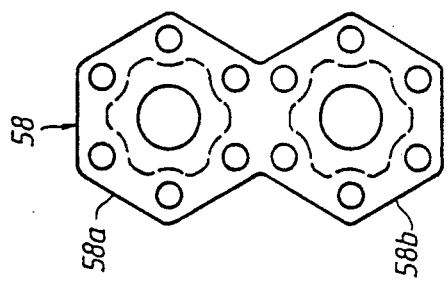
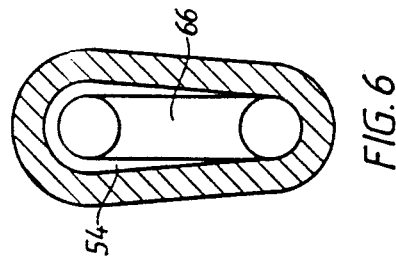
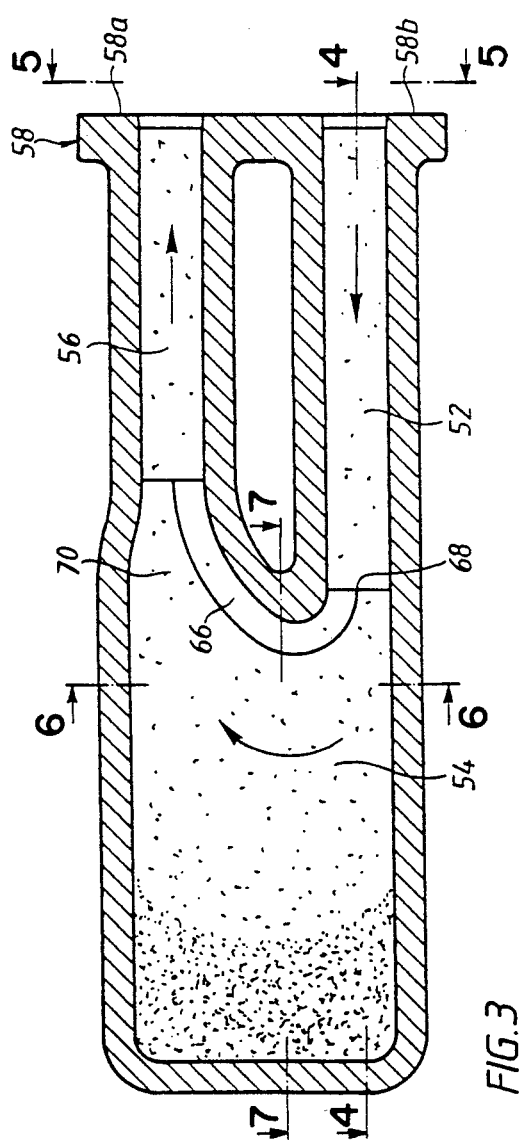
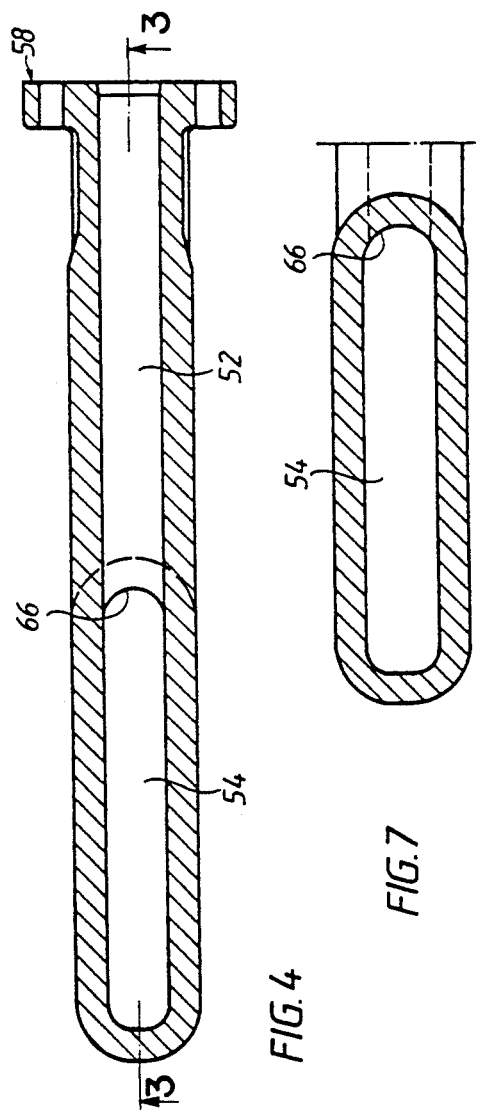

5,176,475

TRANSFER CHAMBERS FOR THE CONVEYOR IN A PNEUMATIC TRANSPORT SYSTEM

TECHNICAL FIELD

The invention relates to a pneumatic transport system for transferring particulate material from a first pressurized container to a second container which is under a lower pressure while successively reducing the pressure. It is built up of a number of parallel tubes arranged in series which at their ends are joined to transfer chambers for the gas/material flow from an upstream tube to a downstream tube. Transport systems of this kind may advantageously be used for discharging dust (ashes) from gas cleaners in a PFBC power plant or bed material from a combustor in such a plant.

PFBC are the initial letters of the English expression Pressurized Fluidized Bed Combustion.

BACKGROUND ART

A transport device of the above kind for successive reduction of the pressure by repeatedly changing a gas/particle stream is disclosed in European Patent 0 108 505 applied to a PFBC power plant. In this a combustor and a cleaner for combustion gases are enclosed within a pressure vessel and surrounded by compressed combustion air. The operating pressure in the plant may amount to about 20 bar. In its most appropriate embodiment the transport device comprises a number of parallel tubes which are connected in series with a number of transfer chambers where the diversion of the gas/particle stream occurs. A special embodiment of a transfer chamber is shown and described in Swedish patent application 8500923-1. The pressure-reducing transport device may be designed and arranged as a cooler for separated dust from the combustion gases in the PFBC power plant.

A transport device designed as an ash cooler and provided with transfer chambers according to the invention is shown and described in the Swedish parallel application 8900133-3.

The material to be fed out from a gas cleaner or a combustor is often abrasive and has a high temperature, up to about 900° C. Since the transport device is able to operate continuously and without valves, as in lock hopper systems, it is exceedingly suitable for feeding out dust/ashes from gas cleaners.

SUMMARY OF THE INVENTION

The invention aims to provide a transfer chamber with optimum characteristics for the transport system, for diversion of a gas/particle stream with minimum erosion in the transfer chamber.

According to the invention the transfer chambers are formed with tubular inlets and outlets opening out into a space for diversion of a gas/material stream 180° between the inlet and the outlet. In this space the wall between the inlet and the outlet is formed with a double-bent asymmetrical saddle-formed surface which conforms to the wall surfaces of the inlet and the outlet. At the lowermost point of the saddle-formed surface the cross section at the outlet is greater than at the inlet. The asymmetry results in a more favourable flow configuration and the larger cross section gives a lower flow rate at the outlet. These two factors result in reduced erosion and a longer life of the transfer chamber.

The space is also suitably formed with a chamber width at the outlet side than at the inlet side.

The transfer chamber is suitably made in the form of an alloy of castings of a heat-resistant and abrasion-resistant material.

BRIEF DESCRIPTION OF THE DRAWING

The invention will be described in greater detail with reference to the accompanying drawing, wherein FIG. 3 shows a longitudinal section through a transfer chamber according to B—B in FIG. 4, FIG. 4 shows a section through a transfer chamber according to A—A in FIG. 3, FIG. 5 shows an end view of a transfer chamber according to C—C in FIG. 3, FIG. 6 shows a section according to D—D in FIG. 3, and FIG. 7 shows a section according to E—E in FIG. 3.

DESCRIPTION OF THE PREFERRED EMBODIMENT

Figure 1:
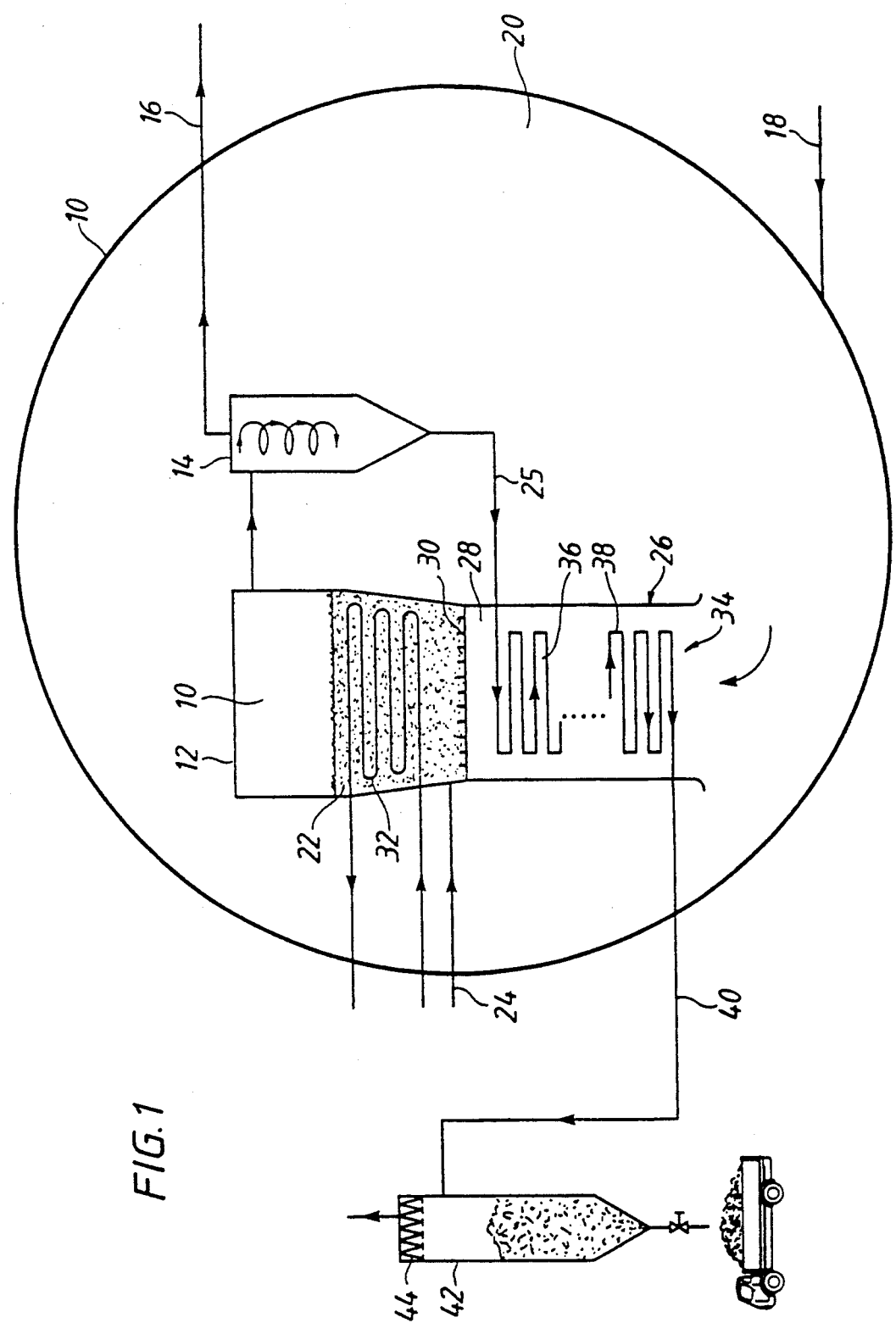
FIG. 1 shows a PFBC power plant in which the invention is utilized as a pressure-reducing discharge device and cooler of ashes separated in a gas cleaner.

In the figures, 10 designates a pressure vessel which surrounds a combustor 12 and a gas cleaning plant 14 which is symbolized by a cyclone. In the gas cleaning plant 14, dust from combustion gases are separated from the combustor 12 before being supplied to a gas turbine (not shown) via the conduit 16. The gas turbine drives a compressor which, via the conduit 18, feeds the space 20 between the combustor 12, the cleaning plant 14 and the pressure vessel 10 with compressed combustion air. The combustion is performed in a bed 22 of particulate material in the combustor 12. Fuel is supplied to the combustor 12 in the lower part of the bed 22 via the conduit 24 and nozzles (not shown). The combustor 12 is supplied with compressed air from the space 20 for fluidization of the bed 22 and combustion of supplied fuel via the duct 26 and the bottom 28 with air nozzles 30. The combustor 12 includes tubes 32 for cooling of the bed 22 and generation of steam for a steam turbine. Dust separated in the gas cleaner 14 and consisting of ashes and residues of bed material is fed out via the conduit 25 and a pressure-reducing pneumatic discharge the device 34, formed as a cooler, placed in the duct 26. The device 34 is composed of a number of tubes 36 and transfer chambers 38 connecting an upstream tube 36 to a subsequent downstream tube 36. The dust is forwarded in the conduit 40 to a collecting container 42 with a filter 44 for cleaning the transport gas.

Figure 2:
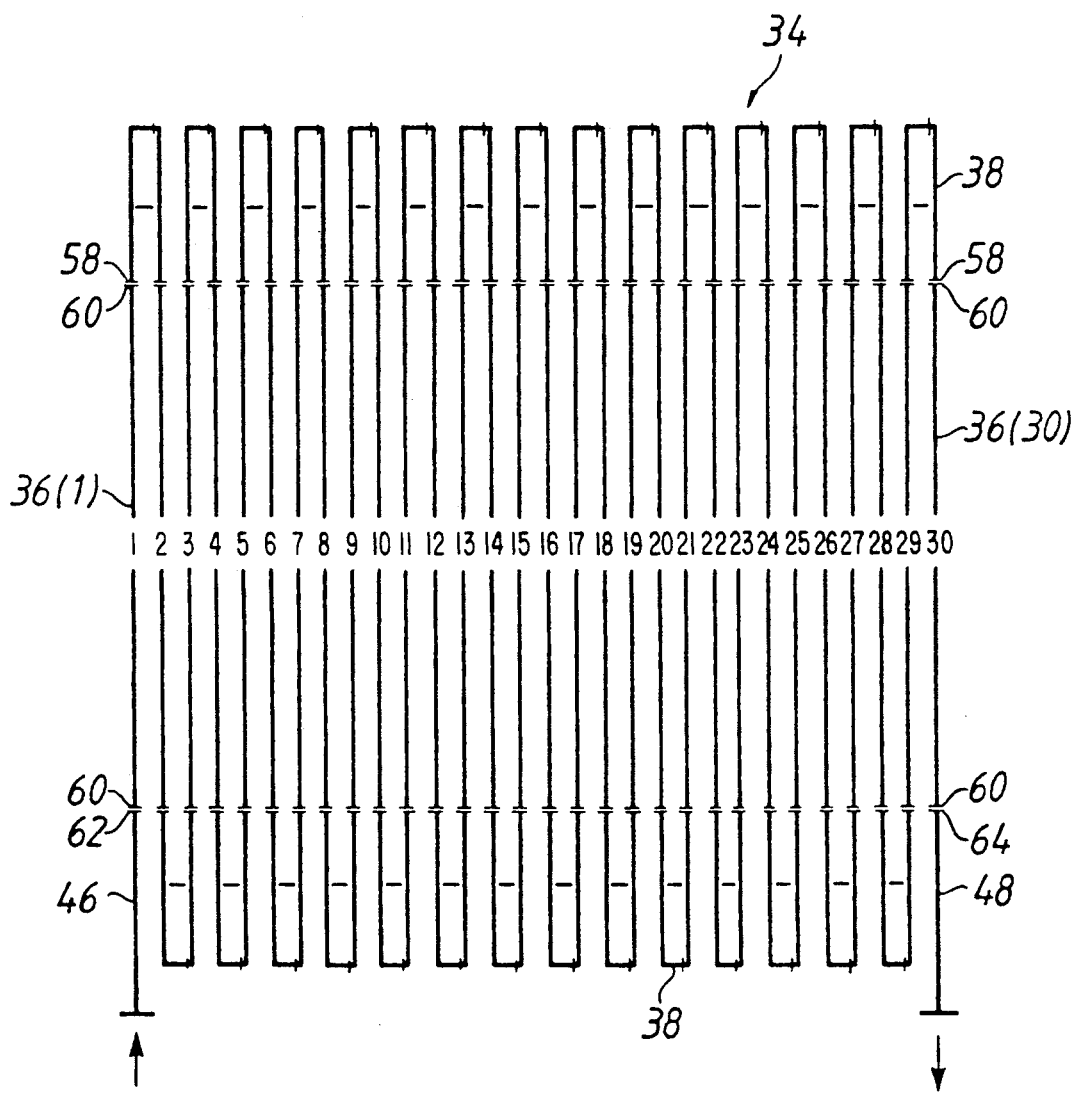
FIG. 2 shows a diagram of such an ash discharge device and cooler comprising 30 tube parts and 29 transfer chambers connecting the tube parts.

FIG. 2 shows a diagram of a discharge device with 30 parallel tubes 36 connected together by means of 29 transfer chambers 38, an inlet tube 46 and an outlet tube 48. The conduit 46 is connected to the conduit 25 from the cleaning plant 14 and the outlet conduit 48 is connected cleaning plant 14 and the outlet conduit 48 is connected to the conduit 40 in the container 42. The numbers 1–30 in the tubes 36 in FIG. 2 denote the ordinal numbers of the tubes 36 forming part of the discharge device 34.

As shown in FIGS. 3 and 4, the transfer chambers are formed with a tubular inlet 52, a space 54, a tubular outlet 56 and a flange 58. The flange 58 is composed of two parts 58a and 58b of hexagonal shape joined to each other at one of the sides. The transfer chambers 38 are manufactured by casting of a wear-resistant alloy. The tubes 36 are provided at their ends with flanges 60, suitably also of hexagonal shape. Also the tubes 46 and 48 are provided with suitably hexagonal flanges 62 and 64, respectively, for connection to the first and last tubes, 36 (1) and 36 (30), respectively. The tubes 36 and the transfer chambers 38 are joined together by means of these flanges 58, 60 and bolted joints. The design of the flanges with two hexagonal parts is exceedingly advantageous. The tubes 36 and the transfer chambers 38 may be placed in a simple manner in several layers with a small distance between the layers of the tubes 36. The flanges of an upper layer rest on the flanges of an underlying layer. By turning a transfer chambers 45°, a change from a lower layer to an upper layer in the discharge device 32 can be made in a simple manner, and a displacement of the tubes in the various layers by half a pitch, which is desirable in view of cooling, is automatically obtained.

The surface 66 in the space 54 at the transition between the inlet 52 and the outlet 56 is saddle-formed and asymmetrical. By this asymmetry the area at the orifice 70 of the outlet 56 is considerably larger than the area at the orifice 68 of the inlet 52 in the space 54. This asymmetry results in a favourable flow, from the point of view of erosion, at the diversion of the gas/material stream. This fact and the reduced speed at the orifice 70 of the outlet 56 by the larger area, result in fewer particles hitting the walls when flowing into the outlet 56, and in a reduced speed of the particles hitting the walls in this region, which is critical from the point of view of erosion, compared with prior art transfer chamber designs. By making the space 54 with a larger width at the outlet side, additionally improved properties of the transfer chambers are obtained.

I claim:

1. A pneumatic transport system for transferring particulate material from a first pressurized container to a second container which is under a lower pressure, while successively reducing the pressure comprising; a number of parallel tubes, arranged in series, tubes for transferring a gas/material stream from an upstream tube to a downstream tube; wherein the transfer chambers have tubular inlets and outlets opening out into a space in which a wall portion between the inlet and outlet has an asymmetrical saddle form, wherein the cross section at an orifice of the outlet into said space is considerably larger than the cross section at an orifice of the inlet into said space.

2. A pneumatic transport system according to claim 1, wherein the space of the transfer chamber has a larger width at the outlet side than at the inlet side.

3. A pneumatic transport system according to claim 1, wherein the tubular inlet and outlet of the transfer chamber are formed with hexagonal flanges for connecting the transfer chambers to said parallel tubes.

4. A pneumatic transport system according to claim 3, wherein the flanges are joined to each other at one side so as to form a continuous flange.

* * * * *